(12) United States Patent
Heinzen et al.

(10) Patent No.: US 7,306,444 B2
(45) Date of Patent: Dec. 11, 2007

(54) APPARATUS AND METHOD FOR FORMING FOOD PRODUCTS BY GRADUAL COMPRESSION

(75) Inventors: Thomas E. Heinzen, Burnsville, MN (US); James W. Finkowski, Andover, MN (US); Jimmy A. Demars, Hugo, MN (US)

(73) Assignee: General Mills Cereals, LLC, Minneapolis, MN (US)

( * ) Notice: Subject to any disclaimer, the term of this patent is extended or adjusted under 35 U.S.C. 154(b) by 459 days.

(21) Appl. No.: 10/421,484

(22) Filed: Apr. 22, 2003

(65) Prior Publication Data

US 2004/0211323 A1 Oct. 28, 2004

(51) Int. Cl.
*A21C 11/00* (2006.01)
*A21B 1/48* (2006.01)
(52) U.S. Cl. .................. 425/89; 425/371; 99/353
(58) Field of Classification Search .......... 425/89, 425/371; 99/353, 443 C
See application file for complete search history.

(56) References Cited

U.S. PATENT DOCUMENTS

| | | | |
|---|---|---|---|
| 782,614 A | 2/1905 | Manning | |
| 795,581 A | 7/1905 | Corby | |
| 1,126,606 A | 1/1915 | Wolf | |
| 1,270,096 A | 6/1918 | Baker | |
| 2,595,865 A | 5/1952 | Lunsford | |
| 2,642,013 A | 6/1953 | Enoch | |
| 2,907,268 A | 10/1959 | Doolin | |
| 3,572,258 A | 3/1971 | Tangel | |
| 3,646,880 A * | 3/1972 | Norris | 99/443 C |
| 3,693,533 A | 9/1972 | Liepa | |
| 3,723,230 A * | 3/1973 | Troutner | 156/580 |
| 3,937,852 A | 2/1976 | Wolf | |
| 3,942,929 A | 3/1976 | De Mets | |
| 4,015,517 A * | 4/1977 | Pomara, Jr. | 99/443 C |
| 4,197,792 A | 4/1980 | Mendoza | |
| 4,311,550 A * | 1/1982 | Kerttula | 425/371 |
| 4,417,866 A * | 11/1983 | Sitzler | 425/371 |
| 4,460,611 A | 7/1984 | Suzuki | |
| 4,515,578 A * | 5/1985 | Burger | 474/231 |
| 4,517,148 A * | 5/1985 | Churchland | 425/371 |
| 4,552,523 A | 11/1985 | Suzuki | |
| 4,718,843 A * | 1/1988 | Carlsson et al. | 425/371 |
| 4,869,661 A | 9/1989 | Nogueroles | |
| 4,877,632 A | 10/1989 | Nogueroles | |
| 5,204,123 A | 4/1993 | Hayashi | |
| 5,527,551 A | 6/1996 | Fager | |

FOREIGN PATENT DOCUMENTS

| | | |
|---|---|---|
| EP | 0 251 138 | 1/1988 |
| WO | WO 95/03713 | 2/1995 |

* cited by examiner

*Primary Examiner*—James P. Mackey
(74) *Attorney, Agent, or Firm*—John A. O'Toole; Douglas J. Taylor; Timothy A. Czaja

(57) ABSTRACT

The present invention is directed to methods and apparatuses for processing food products and utilizes a series of guides for moving platens through several operative zones to press a food product intermediate. In particular, the present invention relates to an apparatus and method for forming generally flat dough products such as tortillas, taco shells, snacks and the like by gradually pressing a dough intermediate between movable platens that are disposed on concentric, endless belts.

16 Claims, 7 Drawing Sheets

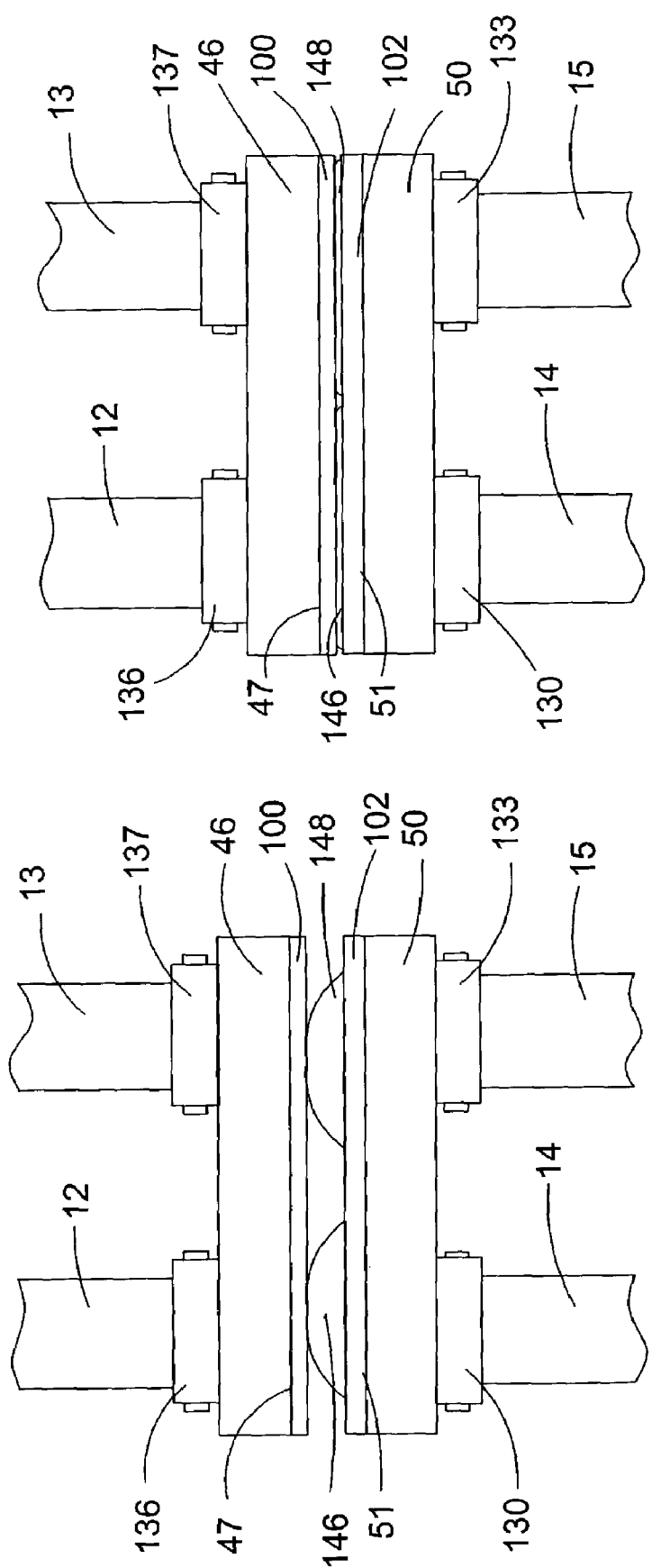

APPARATUS AND METHOD FOR FORMING FOOD PRODUCTS BY GRADUAL COMPRESSION

TECHNICAL FIELD

The present invention relates generally to an apparatus and methods for forming food products. In particular, the present invention relates to an apparatus and method for forming generally flat dough products such as tortillas, taco shells, snacks and the like by gradually pressing a dough intermediate between movable platens that are disposed on concentric, endless belts.

BACKGROUND OF THE INVENTION

A wide variety of processes are known for forming dough intermediates into final products. Examples of such products include tortillas, pizza crusts, pie crusts, pastries, and cookies as well as snack products, including chips or crisps and fruit snacks.

It is widely recognized that many aspects of the manufacturing processes can have a substantial impact on the price that a consumer pays for the product. Usually, the cost of a product decreases in proportion to an increase in the speed with which the product can be fabricated. Additionally, process improvements that simplify the associated equipment may lead to decreases in the costs of obtaining and operating such equipment.

In the manufacture of flat products such as tortillas, piecrusts, snack products, and the like efforts have been increasingly directed toward reducing costs and increasing the speed of production. Traditionally, several manufacturing techniques have been utilized for economically and quickly forming tortillas on commercial production lines. A first popular method is known as die-cutting and a second popular method is known as pressing, both of which are described below.

In the die-cutting technique, tortilla dough is first formed in a commercial mixer. The dough is then transferred to an extruder that extrudes a sheet of dough onto a conveyor belt of a rolling and cutting machine to form a dough ribbon. In this step, the dough ribbon is gradually reduced to a predetermined thickness by sheeting and cross-rolling.

Once the dough has reached a desired thickness, a die is actuated to cut the dough into the desired form. The formed dough products are then separated from the remaining matrix and are moved to an oven where they are cooked. The matrix is usually returned to the extruder for reprocessing.

Several problems and limitations exist with the die-cutting method described above. One such problem is that the remaining matrix is often coated with flour prior to cutting to prevent the die from sticking to the dough. When this dough and flour is reprocessed, the extra flour and floor time can produce undesirable properties within the dough. For example, the flour can inhibit re-mixing, causing the subsequently processed dough product (e.g. tortilla) to be substantially inflexible or brittle, and may produce an undesirable taste in the product.

In addition, having the dough products produced by this method usually has a rheoligical bias in the direction of sheeting. That is, the tortilla will crack when folded in the direction that is transverse or perpendicular to the direction of the sheeting. Moreover, the sheeting process described above does nothing to seal the surface of the dough. Sealing the surface of the dough traps leavening gasses during baking which has been found to improve final bake quality of the product.

As mentioned above, a second common process for forming tortillas is by pressing, which is also referred to as the hot press method. In practice, dough balls are formed, proofed, and fed onto a conveyor that carries several dough balls at a time into position between the heated platens (up to 450° F.) of a tortilla press. Such relatively high temperatures must be imparted to the tortillas by the platens to overcome the inherent elastic tendency of the dough to snap-back after pressing. In other words, without sufficiently heating the dough, the tortillas will typically thicken and shrink in size, snap back or return to its original size. In addition, dough properties can vary from batch to batch, and may also vary significantly within a single batch. This creates further problems in providing a consistent and uniform product from a consumer standpoint.

In the pressing process, a batch of dough balls are positioned between heated press platens, the conveyor is then stopped and the press is closed compressing the balls into circularly shaped tortillas that are then transferred into an oven for baking. Using this method, the tortillas may be formed at reasonable production speeds, however, the time required for opening and closing the press and indexing the belt carrying the dough severely limits production to about 14 to 16 strokes per minute.

In addition, to limited production speeds, this method suffers from other drawbacks. For example, the individual components are more expensive when compared with a die cutting operation. Moreover, the intermittent movement and engagement of the platens adds further complexity to the system. Additionally, alignment of the dough balls with the press platens increases the difficulty in operating the equipment and may contribute to other problems, such as, misalignment which can lead to the tortillas being irregular or have a non-uniform thickness, such that they are not of an acceptable quality.

What is needed therefore, is an apparatus that overcomes the difficulties set forth above and which can process flat dough products in an efficient manner while maintaining consistently good, quality products.

SUMMARY OF THE PRESENT INVENTION

The present invention overcomes the disadvantages and shortcomings of the prior art by providing methods and apparatuses for forming substantially circular, planar dough products at commercially acceptable speeds while having a consistent and repeatable quality.

In one aspect of the present invention, an apparatus for forming a pressed food product from a dough intermediate is described and includes pressing the intermediate between first and second platens. In this embodiment, the apparatus includes a support frame that has first and second guides that are supported and positioned by the frame and are used to guide the first and second platens into position. The first and second guides further include a region where the first guide converges with the second guide and a second region where the first guide is substantially parallel to the second guide. The first guide is used to position the first platen and the second guide positions the second platen as the platens move through the converging region. The first and second platens converge together so that a dough intermediate which is disposed between the platens may be effectively pressed. The first and second platens may be substantially parallel to one another and are usually separated by a predetermined spacing as the platens move through the parallel region. The predetermined spacing generally corresponds to the desired thickness of the pressed dough product to be produced.

A method of forming a food product in accordance with the present invention is also described and may include the steps of initially moving a food product intermediate in a machine or first direction, and then moving a first platen in a direction generally towards a second platen, so as to be able to contact the food product intermediate. The first platen is disposed in an opposite position to the second platen so that the platens generally converge with one another in the direction of travel of the endless belts. As the first and second platens move through the converging region, the first platen and second platens converge to compress the food product intermediate to a desired thickness thereby forming a pressed food product, such as a tortilla, pizza crust, piecrust, snack product or the like.

In an additional aspect of the present invention, the above method may further include the step of moving the first and second platens through a second parallel region that holds the food product between the platens. The parallel region extends a predetermined length in the direction of travel of the endless belts. The first platen generally opposes the second platen and the platens are desirably parallel to one another and spaced apart a distance that corresponds to a desired thickness of the pressed food product.

In another aspect of the present invention, a method for reducing the thickness of a sheet of dough product is described and may include the steps of initially providing a sheet of dough that has an initial thickness; then directing a first and second movable endless belts toward one another so as to engage the sheet of dough. The sheet of dough has generally opposing surfaces. The movable endless belts each include a contact surface such that the contact surfaces of the endless belts converge with one another in a first region. The engagement step includes the contact surfaces of the endless belts contacting the opposing surfaces of the dough which the dough travels through the apparatus. That is, the endless belts converge to compress the dough product to form a dough product that has a thickness which is generally less than the initial thickness of the dough.

In yet another aspect of the present invention, the above method for reducing the thickness of a sheet of dough may additionally include the step of moving the first and second endless belts through a parallel region while the sheet of dough is disposed between the contact surfaces of the endless belts. In the presently described embodiment, the parallel region extends a predetermined length in the machine direction. In addition, the contact surfaces of the endless belts generally oppose one another and are disposed a predetermined distance apart.

In accordance with other elements of the present invention, the platens, belts or other contact surfaces of the apparatus may be heated or apply heat to the food product being processed.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this specification, illustrate several aspects of the present invention and together with the description of the preferred embodiments, serve to explain the principles of the invention. A brief description of the drawings is as follows:

FIG. 6 is a partial cross-sectional view of the processing system of FIG. 1 showing in particular multiple dough intermediates which are partially compressed in accordance with the present invention and which are within the converging region;

FIG. 7 is a partial cross-sectional view of the processing system of FIG. 1 showing in particular multiple dough intermediates which are fully pressed in accordance with the present invention and which are within the parallel region;

DETAILED DESCRIPTION OF THE PREFERRED EMBODIMENTS

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to apparatuses and methods for processing food products. In particular, the present invention is directed to apparatuses and methods for processing food product such as dough based products and for pressing such dough based products to a desired shape and/or thickness.

Figure 1:
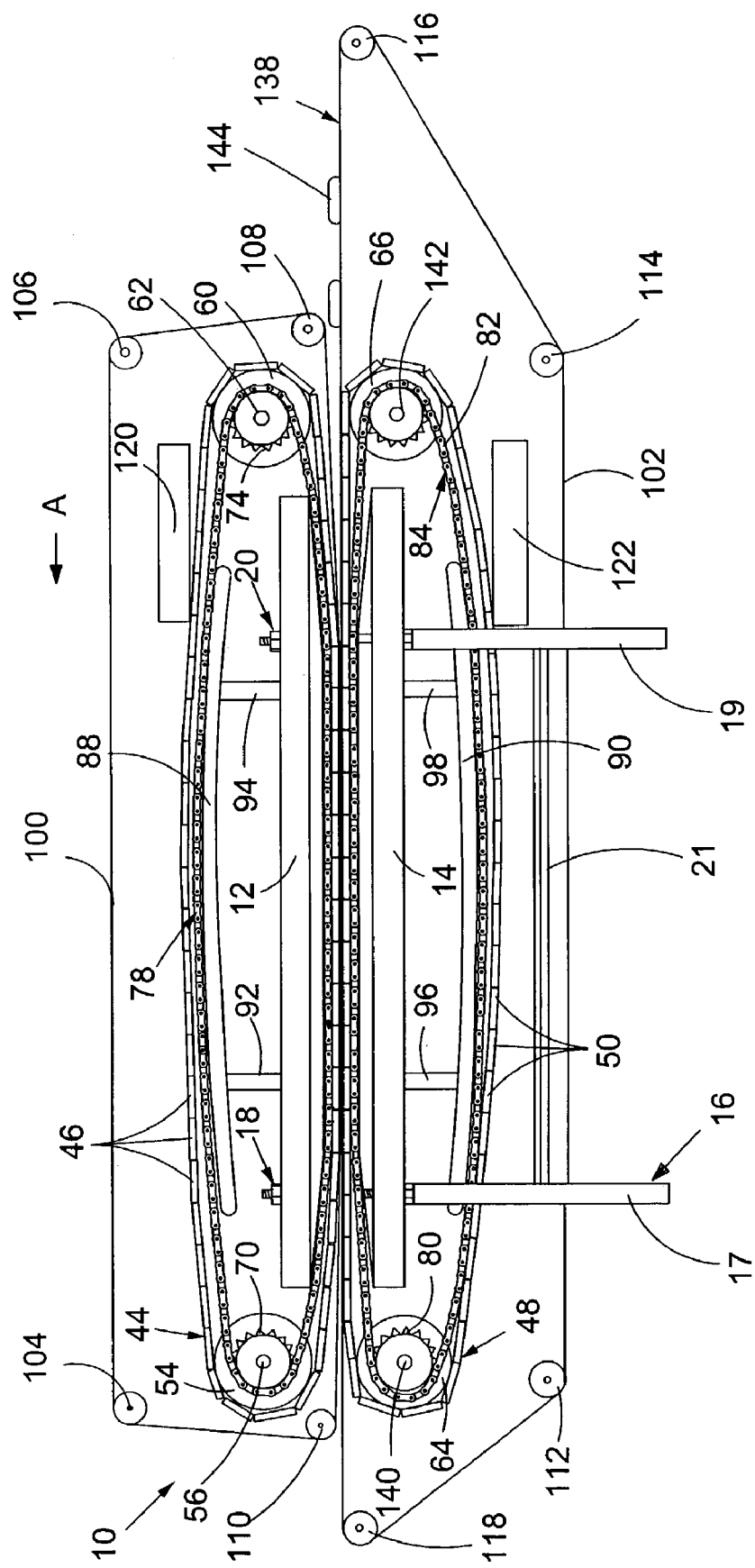
FIG. 1 is a schematic side view of a food product processing system in accordance with the present invention showing upper and lower guides for guiding upper and lower belts having interconnected platens.

With reference to the Figures, one embodiment of a food product processing system 10 is illustrated in FIG. 1. The processing system 10 comprises an upper guide 12 and a lower guide 14 both of which are supported by a frame 16. The frame 16, as shown, includes a first upright support member 17, a second upright support member 19, and a horizontal frame member 21. It is contemplated, however, that the frame 16 may include additional or different frame members to achieve the functional aspects of the present invention. Also, the processing system 10 includes additional upper and lower guides not visible in FIG. 1 that are similar to and generally spaced apart from the upper guide 12 and the lower guide 14 and which are positioned on the other side of the processing system 10. The functional aspects of the upper guide 12 and the lower guide 14 are described in greater detail below.

As can be seen in FIG. 1, the upper guide 12 may be adjustably positioned with respect to the lower guide 14 by a first positioning device 18 and a second positioning device 20. Alternatively, the upper guide 12 may be permanently mounted with respect to the lower guide 14 by any suitable structure. As shown in FIG. 1, the first positioning device 18 and the second positioning device 20 are spaced apart and positioned generally at opposite ends of the processing system 10. Additional positioning devices may be utilized depending upon the application.

The processing system 10 preferably includes an upper belt 44 comprising a plurality of interconnected platens 46 and a lower belt 48 comprising a plurality of interconnected platens 50. In one embodiment, the platens 46 and 50 are connected by way of a bracketed roller chain to form the upper belt 44 and the lower belt 48 respectively. The platens may also be connected by using at least one cable (not shown). In addition, a spring or tension controlling device may be included at a position between the interconnected ends of a cable for regulating changes in tension that may occur in a cable during driving of an interconnected belt of platens through the system.

The platens 46 and 50 may be interconnected by any suitable means such as by using hinges, wires or cables, links, or any such structure or device such that a continuous belt of interconnected platens is formed. Further, the upper belt 44 and the lower belt 48 may comprise continuous bands or belts such as are shown and described with respect to FIGS. 8 and 9 below.

Figure 4:
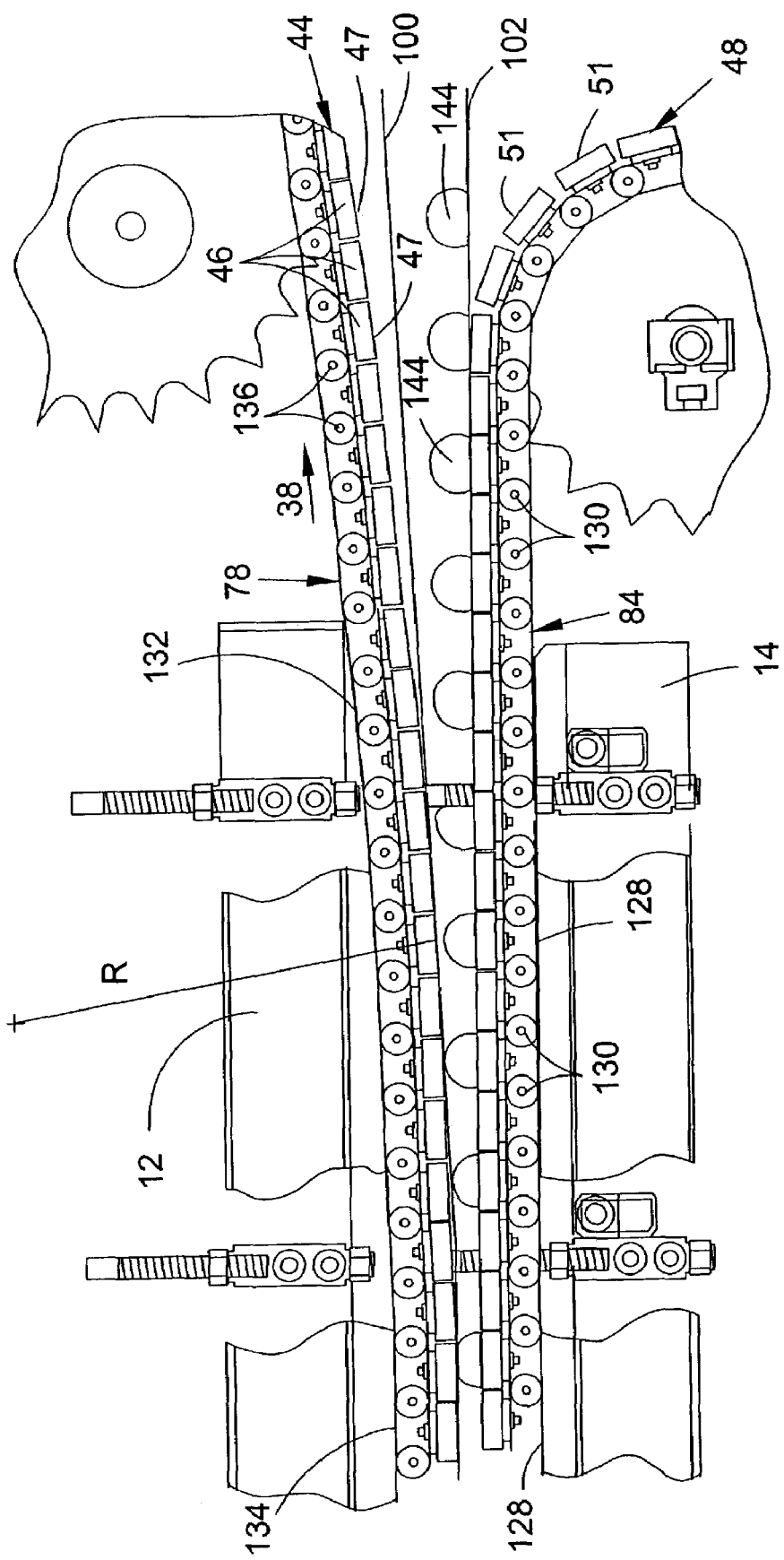
FIG. 4 is a partial schematic side view of the processing system of FIG. 1 showing in particular a converging region and a parallel region in accordance with the present invention.

In accordance with the present invention, the platens 46 and 50 preferably have a flat outwardly facing surface for pressing a food intermediate such as a tortilla or the like, can be seen in FIG. 4. As shown, the platens 46 have a generally flat or planar pressing surface 47 and the platens 50 have a similar pressing surface 51. In an aspect of the present invention, it is contemplated that one or both of the platens 46 and 50 may contain cavities for shaping food products such as by a molding process. For example, the platens 50 may contain a recessed shape for forming a shaped food product such as a cookie product, pie shell, or the like. Accordingly, a food product having a profile generally corresponding to the recessed shape may be formed.

Figure 2:
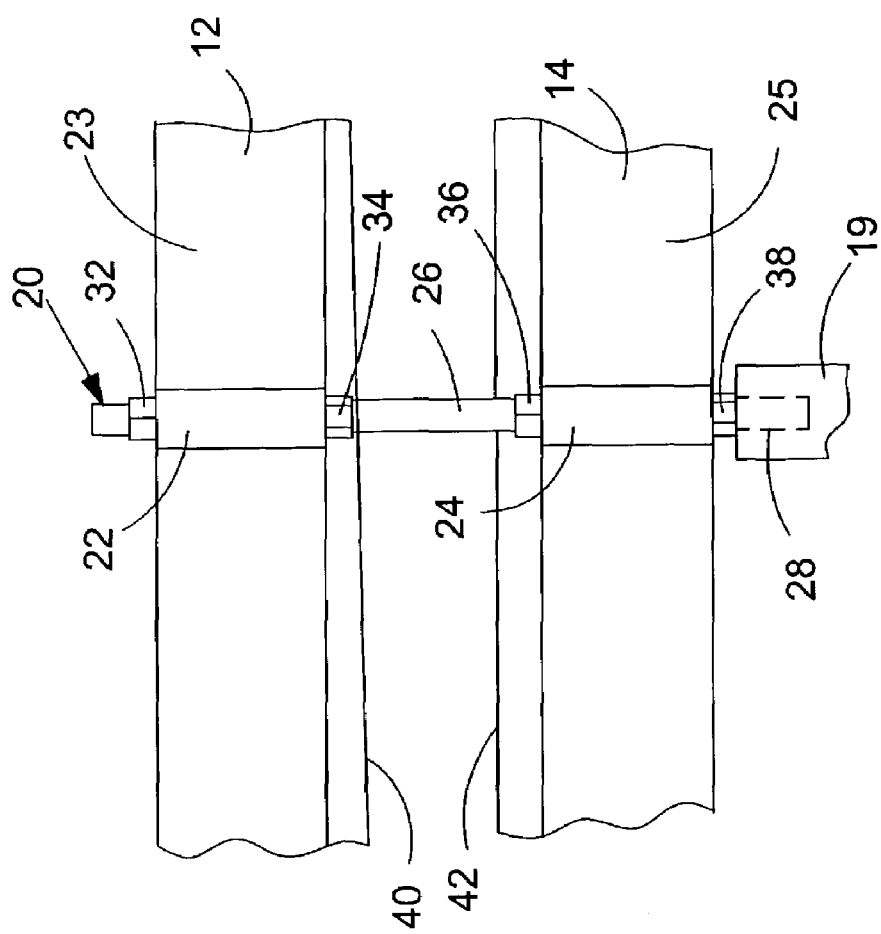
FIG. 2 is a partial side view of a positioning device in accordance with the present invention for adjustably positioning the upper guide with respect to the lower guide.

Turning to FIG. 2, the upper guide 12 preferably includes a portion 22 which extends outward from a surface 23 of the upper guide 12 and the lower guide 14 also include a similar portion 24 which extends outward from a surface 25 of the lower guide 14. In order to support the upper guide 12 with respect to the lower guide 14, a threaded rod 26 passes through the portion 22 and the portion 24 and an end 28 of the threaded rod 26 may be secured within the frame member 19 as can be seen in FIG. 2. The frame member 19 may be any suitable frame member.

As shown in FIG. 2, the positioning device 20 further comprises nuts 32, 34, 36, and 38 for securing and positioning the upper guide 12 and the lower guide 14 with respect to the threaded rod 26. Threaded rod 26 may be threaded into frame member 19, as shown in FIG. 2, and secured by nut 38. The nut 34 may be used to set a predetermined spacing between a guide surface 40 of the upper guide 12 and a guide surface 42 of the lower.

Figure 3:
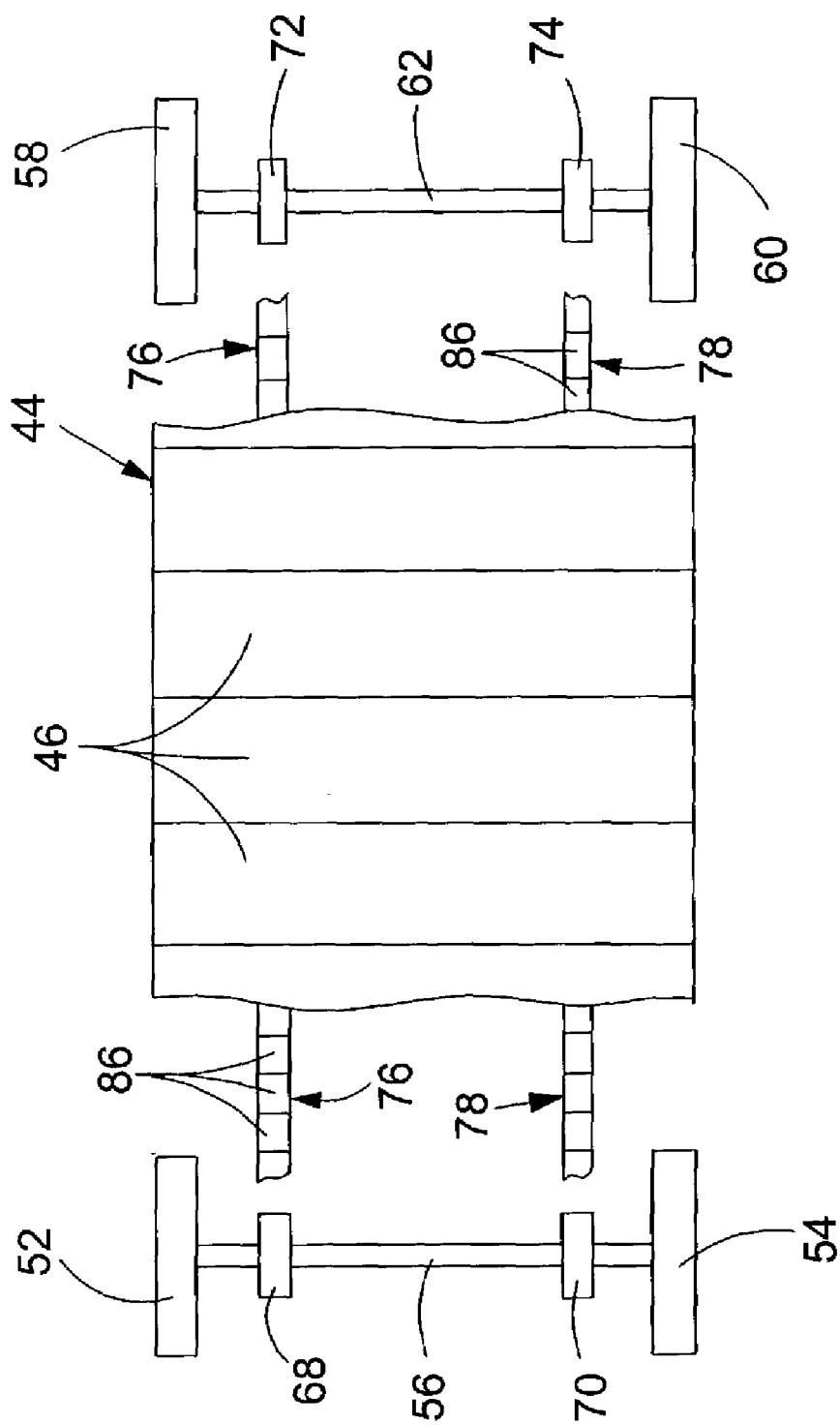
FIG. 3 is a partial schematic top view of the processing system of FIG. 1 showing in particular a belt having interconnected platens, a pair of drive chains and sprockets for the belts and drive chains in accordance with the present invention.

In FIG. 3, a schematic partial top view of the processing system 10 of FIG. 1 is illustrated. In FIG. 3, sprockets 52 and 54 are shown operatively connected to axle 56 and sprockets 58 and 60 are shown operatively connected to axle 62. As can be seen in FIGS. 1 and 3, the sprockets 52, 54, 58, and 60 are preferably used to carry the belt 44 having the platens 46 such as through the use of a drive chain or the like. Sprockets 64 and 66 are illustrated for carrying the lower belt 48. Additional sprockets corresponding to those described with respect to the upper belt 44 are preferably used for carrying the lower belt 48 but are not visible in FIG. 1. As such, it is noted, in this embodiment that the arrangement of the lower belt 48 and its corresponding sprockets is similar to the arrangement of the upper belt 44 and its corresponding sprockets. The arrangement of the lower belt 48 and the upper belt 44 may, however, be different.

Sprockets 52, 54, 58, 60, 64, and 66 illustrated schematically in FIGS. 1 and 3. It should be understood that the assembly of sprockets 52, 54, and the axle 56 as well as the assembly of sprockets 58, 60, and the axle 62 may be mounted to the upper guide 12 or to a suitable frame member. It is further contemplated that the arrangement of sprockets 64 and 66 and the corresponding sprockets and axles which are not illustrated may be mounted to the lower guide 14 or to a suitable frame member. Additionally, the frame 16 of the processing system 10 may preferably include additional frame members for providing operative support for any of the arrangements of sprockets and axles described above.

As provided in FIG. 3, sprockets 68 and 70 are mounted on axle 56 and sprockets 72 and 74 are mounted on axle 62 for carrying drive belt 76 and drive belt 78. That is, sprockets 68 and 72 carry the drive belt 76 and sprockets 70 and 74 carry the drive belt 78. Drive belts 76 and 78 comprise roller chains having links 86. Referring back to FIG. 1, sprockets 80 and 82 are illustrated for carrying drive belt 84. Also, sprockets similar to sprockets 68 and 72 are positioned on axles 140 and 142 for carrying a drive belt similar to drive belt 76 (not shown).

In the present embodiment, the platens are attached by brackets to a roller chain driven by sprockets 52 and 58, on one side of the apparatus and sprockets 54 and 60 on the other side of the apparatus. The roller chains listed as items 76 and 78 may be fixed to the platens or may be free or floating. As such, the guides dictating the travel of the platens 12 and 14 in FIG. 1 may be of different design depending on the exact nature of the roller chain and its relationship to the platens.

Referring to FIG. 1, the processing system 10 preferably includes an upper tensioner 88 and a lower tensioner 90. The upper tensioner 88 can be used to place the drive belt 78 and the belt 44 under a predetermined amount of tension in order to achieve the necessary motive force for the invention and to compensate for thermal expansion.

As can be seen in FIG. 1, the drive roller chain 78 preferably foms a continuous loop and is carried by sprockets 70 and 74 and may be guided by the upper guide 12 and the upper support 101. The platens are fixed to drive roller chains 78 and 84 and the drive chain is drive by brackets.

Also in FIG. 1, the drive chain 84 forms a continuous loop and is carried by sprockets 80 and 82 and may be guided by the lower guide 14 and the platen support carrier 102. The platens are bolted to drive roller chains 78 and 84 by brackets. On a wide machine, there may be several drive rollers chains across the width of the machine as just described to carry the compression load. In another embodiment, only the outer roller chains may be fixed to the platens while the inner roller chains may be free floating. As such, the inner roller chains may follow inner roller chain guides with a different design to account of the height difference of the roller chain.

Further referring to FIG. 1, the processing system 10 preferably includes an upper belt 100 carried by pulleys 104, 106, 108 and 110 and a lower belt 102 carried by sprockets 112, 114, 116 and 118. At least one of the sprockets 104, 106, 108, and 110 may be driven for driving the belt 100 through the processing system 10. As above, at least one of the sprockets 112, 114, 116, and 118 is driven for driving the belt 102 through the processing system 10.

In addition to compression forces, heat may also be applied to the food product being processed by the processing system 10 by heating the platens 46 and 50. As an example, the material for the belts 100 and/or 102 may be chosen such that the heat transfer rate between the platens can be modified if needed. For example, the belts 100 and/or 102 may have portions or regions that are open or perforated to differentially control the heat transfer rate between the platens and the food product. For certain food products this may advantageously provide greater control over the post-processed characteristics of the food product. That is, certain food products, if heated too rapidly, may develop undesirable surface toughness or other undesirable features.

The belts 100 and/or 102 may also have a nonstick surface so that food product will not stick to the surface. One preferred nonstick material for the belts 100 and/or 102 is Teflon®, however, other nonstick materials, such as silicone, or the like may be used.

The processing system 10 includes an upper heater 120 and a lower heater 122 which are illustrated schematically in FIG. 1. In one aspect of the present invention, the upper heater 120 can be used to heat the platens 46 of the belt 44 and the lower heater 122 can be used to heat the platens 50 of the belt 48. The heaters 120 and 122 may comprise any conventional device such as electric or fuel fired radiant heaters or may utilize a convective heat transfer mechanism such as by using forced air to heat the platens 46 and 50 respectively. Further, it is understood that the heaters 120 and 122 may be connected to sensors (not shown) for measuring the temperature of the platens 46 and 50. For example, sensors such as thermocouples or infrared sensors may be positioned with respect to the platens 46 and 50 in order to measure the temperature of the platens 46 and 50. Additionally, the sensors may be utilized in combination with a control system capable of providing feedback to the heaters 120 and 122 for adjustably controlling the temperature of the platens 46 and 50. As such, accurate temperature profiles may be provided for processing food products having different requirements. In certain applications, either or both of the platens 46 and 50 may be cooled rather than heated as described above.

In FIG. 4, a schematic view of a portion of the processing system 10 is illustrated showing in particular a converging region 124 and a parallel region 126. The converging region 124 functions as a pressing region and the parallel region 126 functions as a holding and or baking or sealing region for processing food product. The lower guide 14 has a guide surface 128 for guiding the drive belt 84, which is a roller chain having rollers 130. The platens 50 of the belt 48 are driven in a direction A (the machine or first direction). Further referring to FIG. 4, the upper guide 12 includes a converging guide surface 132 and a parallel guide surface 134 for guiding the drive chain 78. The drive chain 78 preferably comprises a roller chain having rollers 136.

As the belt 44 and the belt 48 are driven in direction A, the platens 50 of the belt 48 follow the guide surface 128 of the lower guide 14. In an exemplary embodiment, the platens 50 follow a substantially horizontal path. This is generally preferred as the dough 144 may be introduced to the processing system 10 by being placed on the belt 102 at a loading region 138 of the processing system 10 as is shown in FIG. 1. The horizontal path for the platens 50 provides positionally stability for the food product as the food product enters the converging region 124. Further, as the belt 44 and the belt 48 are driven in the direction A, the platens 46 of the belt 44 may follow the converging surface 132 and may converge towards the platens 50 of the belt 48.

In the present embodiment, the converging guide surface 132 may be formed such that it has a radius, R, of about 40 feet (see FIG. 4). Such a guide surface approximates a roller having a diameter of about 80 feet. By using such a large radius for the converging guide surface 132 this provides for gradual compression of a food product as the platens 46 and 50 move through the converging region 124 in direction A. By gradually compressing the food intermediate it has been found that such a process generally requires less force when compared with faster pressing methodologies typically utilized in conventional food product presses. That is, the present invention may provide increased compression time overall while providing gradual compression of the food product as it is pressed, thereby reducing stress on the dough.

The exemplary operative driving motion of the processing system 10 is described with reference to FIGS. 1 and 3. The upper drive system for driving the upper belt 44 having the platens 46 includes sprockets 54 and 70 mounted on common axle 56 opposite from sprockets 68 and 52, and sprockets 60 and 74 mounted on common axle 62 opposite from sprockets 72 and 58. The upper drive system further includes drive belt 78, which is carried by sprockets 70 and 74 and drive belt 76 which is carried by sprockets 68 and 72. Sprockets 52, 54, 58, and 60 each include an over-running clutch (not shown), which allows the sprockets 52, 54, 58, and 60 to controllably slip with respect to the sprockets 68, 70, 72, and 74. In FIG. 1, the lower drive system for driving the lower belt 48 having the platens 50 includes sprockets 64 and 80, which are mounted on common axle 140, and sprockets 66 and 82, which are mounted on common axle 142. The lower drive system further includes the drive belt 84. Sprockets 64 and 66 each include an over-running clutch (not shown), which allows the sprockets 64 and 66 to controllably slip with respect to the sprockets 80 and 82. Additionally, the lower drive system includes similar sprockets (not shown) mounted on axle 140 opposite from sprockets 64 and 80 and includes similar sprockets mounted on axle 142 opposite from sprockets 66 and 82. The lower drive system also includes an additional drive belt (not shown), which is carried by the sprockets (not shown) opposite from sprockets 80 and 82.

In an exemplary embodiment, the axles 56 and 140 each include a drive motor (not shown) and the axles 62 and 142 are not driven. Under operating conditions where no food product is being processed by the processing system 10, the sprockets 54 and 64 preferably drive the platens 46 and 50 in direction A (FIG. 1). In such operation, the drive belts 78 and 84 move without providing substantial driving force to the platens 46 and 50. That is, the drive belts do not frictionally engage the platens as they do when food product is being processed by the system 10. This is because the tensile load on the link between the platens is generally low when no food product is being processed.

Under operating conditions where the system is processing food product, that is, where food product is being compressed between the platens 46 and 50, it is preferred for the drive chain 78 to provide additional driving force to the platens 46 and 50 by frictionally engaging with the platens 46 and 50. This is because the tensile forces on the interconnected platens 46 and 50 of the belts 44 and 48 may become generally too large for the sprocket 54 to provide reliable drive motion to the platens 46 and 50 when food product is being compressed between the platens 46 and 50. Also, the interconnected platens may have a variable velocity as the platens hinge around the respective platen sprockets, especially for a generally wide platen and correspondingly small sprocket. This is sometimes referred to as "chordal action" with respect to a driven chain having interconnected links.

In operation, the processing system 10 may be utilized to form a generally flat food product, such as a tortilla taco shells, snacks and the like. A dough intermediate 144 may be introduced to the processing system 10 at a loading region 138 as is illustrated in FIG. 1. The dough intermediate is loaded onto a nonstick surface such as the belt 102 described above. In operation, the driving motion of the system conveys the dough intermediate in direction A such that it may enter the converging region 124 as is illustrated in FIG. 4.

Figure 5:
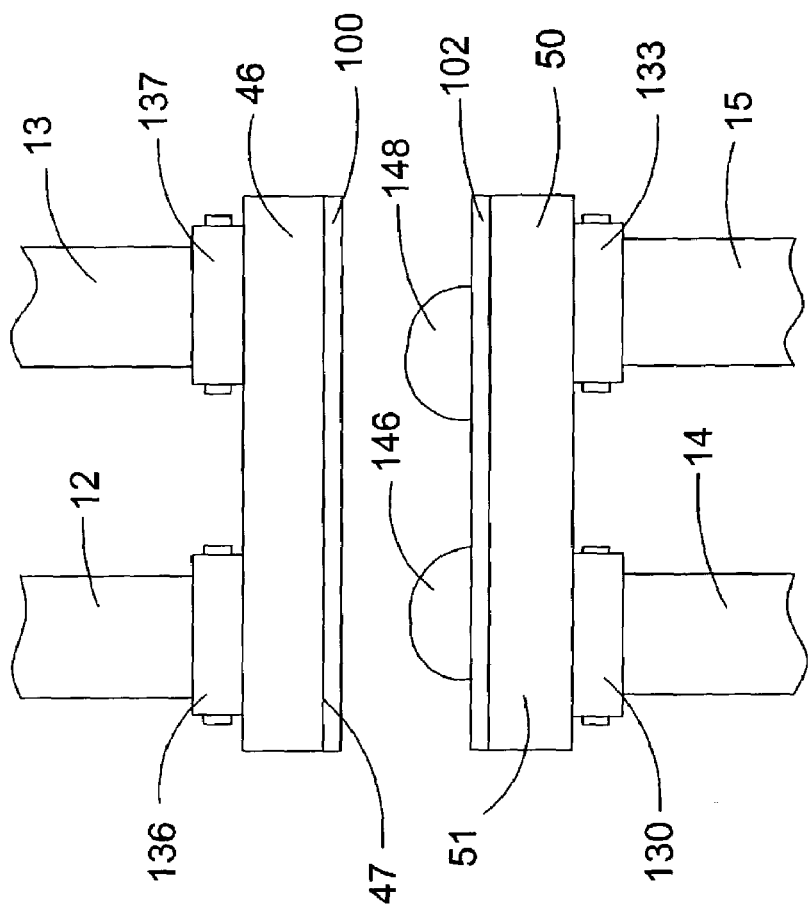
FIG. 5 is a partial cross-sectional view of the processing system of FIG. 1 showing in particular multiple dough intermediates entering the converging region of the processing system in accordance with the present invention.

In FIG. 5, the processing system 10 is shown in partial cross-section according to the present invention. The upper guide 12 and the lower guide 14 are shown guiding the rollers 136 and 130 and the platens 46 and 50, respectively. Additionally, an upper guide 13 and a lower guide 15 are shown guiding rollers 137 and 133 and the platens 46 and 50, respectively. In this figure, the belts 100 and 102 are illustrated and dough intermediates 146 and 148 are shown on belt 102 just prior to entering the converging region 124.

Referring to FIG. 6, the dough intermediates 146 and 148 are shown partially compressed as they begin moving through the converging. That is, the platens 46 and 50 are guided by the upper guide 12 and the lower guide 14 such that the dough intermediates 146 and 148 are pressed between the platens 46 and 50.

In FIG. 7, the dough intermediates 146 and 148 are shown in the parallel and are fully pressed to at a predetermined thickness.

For certain applications, the platens 46 and 50 may be heated, to minimize elastic snap back of the pressed dough. In the present embodiment, the dough intermediate 146 and 148 pass through the parallel region 126 while being heated or sealed by the platens 46 and 50. Alternatively, the parallel region 126 may function as a holding region to maintain or hold constant pressure and temperature. Accordingly, heat may be applied to a pressed dough product for a generally long period while maintaining a continuous manufacturing process. A generally longer hold time is advantageous in that a lower temperature may be used.

In an embodiment of the present invention, the processing system 10 may also be used as a dough proofing system. In such a proofing operation, dough may enter the parallel region 126 and be heated by the platens 46 and 50 as it moves through the zone. Such a heating method is advantageous in that the thermal transfer rate between the heated platens in contact with the dough products would be significantly higher than the heat transfer rate obtainable through thermal or convective heating such as in a conventional oven or the like. As such, the present invention may advantageously provide a generally faster and more efficient proofing system, without drying out the dough when compared with a forced air environment such as a conventional convective type proofing system.

In another aspect of the present invention, the processing system 10 may be used for sheeting and/or post-sizing of food products such as snacks, piecrusts, pizza crusts, pastries, pita breads, crackers, masa products and the like. Accordingly, the processing system 10 may comprise continuous endless belts or bands that provide gradual compression of a dough intermediate described above and shown schematically in FIG. 1.

Figure 8:
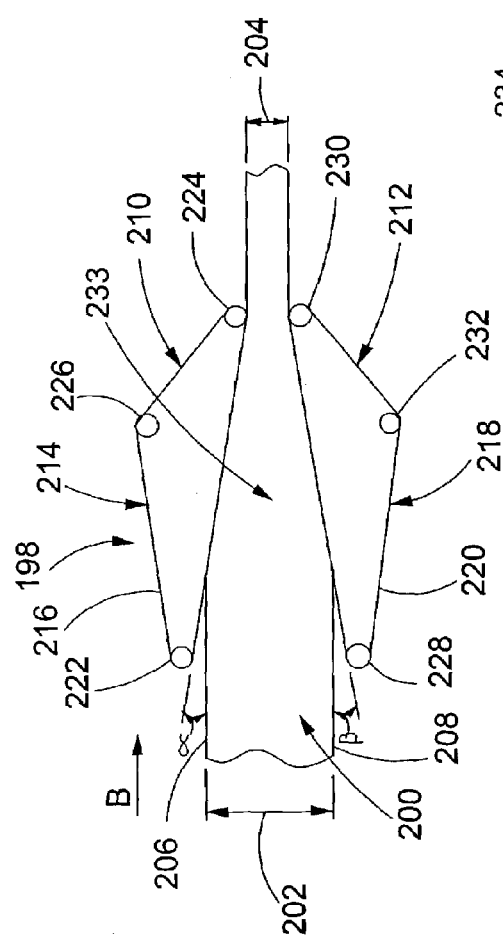
FIG. 8 is a schematic side view of a device for reducing the thickness of a sheet of dough in accordance with the present invention and showing in particular a converging region.
Figure 9:
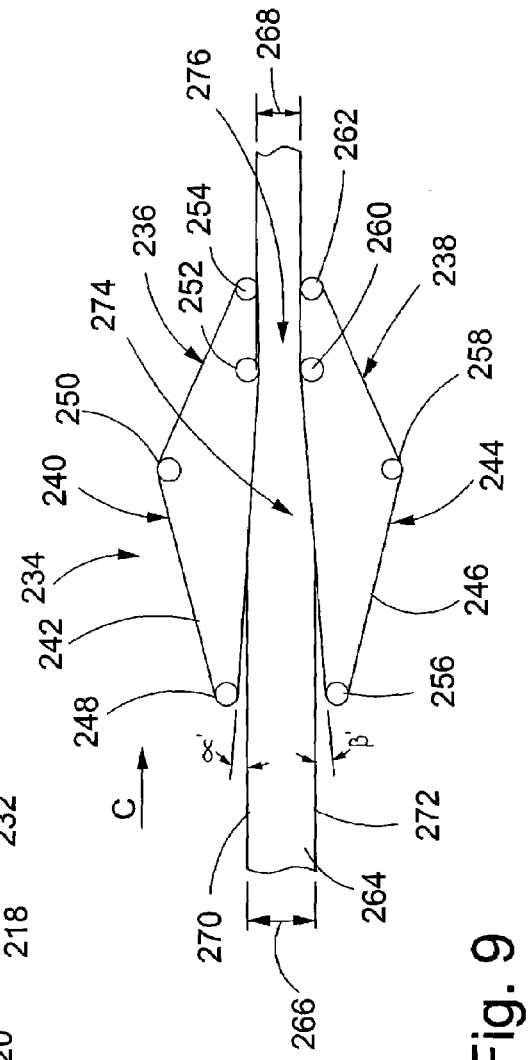
FIG. 9 is a schematic side view of a device for reducing the thickness of a sheet of dough product in accordance with the present invention and showing in particular a parallel region.

In accordance with the present invention, a schematic illustration of a device 198 for reducing the thickness of a sheet of dough product 200 while minimizing dough tearing and providing improved surface characteristics at relatively high processing speeds is shown in FIGS. 8 and 9.

In FIG. 8, the dough intermediate 200 has an initial thickness 202 and a reduced thickness 204. Also, the sheet of dough product 200 generally has a first surface 206 and a second surface 208. As shown the dough intermediate 200 may be gradually compressed from the initial thickness 202 to the reduced thickness 204 as the dough moves in direction B by a first wedge roller device 210 and a second wedge roller device 212. The first wedge roller device 210 comprises a continuous endless belt 214 having a contact surface 216 which may contact and engage the first surface 206 of the sheet of dough product 200. Likewise, the second wedge roller device 212 comprises a continuous endless belt 218 having a contact surface 220, which contacts and engages with the second surface 208 of the sheet of dough product 200 as shown.

As can be seen in the exemplary schematic embodiment of FIG. 8, the first wedge roller device 210 further includes rollers 222, 224, and 226 for supporting and carrying the continuous endless belt 214. At least one of the rollers 222, 224, and 226 is a driven roller for driving the continuous endless belt 214. The roller 226 may provide a tensioning function for adjustably controlling the tension in the continuous endless belt 214 of the first wedge roller device 210. The second wedge roller device 212 further includes rollers 228, 230, and 232 for supporting and carrying the continuous endless belt 218. At least one of the rollers 228, 230, and 232 is a driven roller for driving the continuous endless belt 218. As above, the roller 232 may provide a tensioning function for adjustably controlling the tension in the continuous endless belt 218 of the second wedge roller device 212.

Further referring to FIG. 8, the continuous endless belt 214 of the first wedge roller device 210 is supported and positioned at an angle $\alpha$ with respect to the first surface 206 of the dough 200 and the continuous endless belt 218 of the second wedge roller device 212 is supported and positioned at an angle $\beta$ with respect to the second surface 208 of the dough 200. The preferred arrangement of the first wedge roller device 210 and the second wedge roller device 212 forms a converging region generally indicated by reference numeral 233. Such a converging region may advantageously provide for relatively gentle compression (as compared to that of conventional rollers) of the dough and generally reduce accumulation of elastic stress, especially at generally high processing speeds. The distance between the rollers 224 and 230 as well as the magnitude of the angles $\alpha$ and $\beta$ are adjustably controllable for use with different dough product processing requirements and applications. Furthermore, the angles $\alpha$ and $\beta$ may be empirically determined for a particular application. That is, the angles $\alpha$ and $\beta$ may be derived from observations of the actual operation of the wedge roller devices.

Now referring to FIG. 9, a schematic illustration of a device 234 similar to the device 198 shown in FIG. 8 and described above is illustrated. In general, as described below, the device 234 includes a converging region 274 similar to the converging region 233 of the device 198 and additionally includes a parallel region 276. The device 234 includes a first wedge roller device 236 and a second wedge roller device 238. The first wedge roller device 236 has a continuous endless belt 240 with an outer or contact surface 242 and the second wedge roller device 238 includes a continuous endless belt 244 having an outer or contact surface 246. Also, the first wedge roller device 236 includes rollers 248, 250, 252, and 254 for carrying the continuous endless belt 240 and the second wedge roller device 238 includes rollers 256, 258, 260, and 262 for carrying the continuous endless belt 244. As above with respect to the device 198 shown in FIG. 8, at least one of the rollers 248, 250, 252, and 254 of the first wedge roller device 236 and at least one of the rollers 256, 258, 260, and 262 of the second wedge roller device 238 is a driven roller for driving the continuous endless belts 240 and 244 of the first and second wedge roller devices 236 and 238 respectively.

Further referring to FIG. 9, a sheet of dough product 264 having an initial thickness 266 and a reduced thickness 268 is shown and is prepared in a manner similar to that as described above.

As, illustrated in FIG. 9, the portion of the continuous endless belt 240 between the rollers 252 and 254 is supported and positioned to be generally parallel to direction C while the portion of the continuous endless belt 240 between the rollers 248 and 252 is supported and positioned to be at the angle α' with respect to the portion of the continuous endless belt 240 between the rollers 248 and 252. Similarly, the second wedge roller device 238 a similar arrangement of rollers having a continuous endless belt 244 between the rollers 260 and 262, which is supported and positioned to be generally parallel to direction C while the portion of the continuous endless belt 244 between the rollers 256 and 260 is supported and positioned to be at the angle β' with respect to the portion of the continuous endless belt 244 between the rollers 260 and 262.

The arrangement of the first wedge roller device 236 and the second wedge roller device 238 provides the converging region (rollers 248, 252, 256, and 260) generally indicated by reference numeral 274 and the parallel region (rollers 252, 254, 260, and 262) generally indicated by reference numeral 276. As above, with respect to the device 198 shown in FIG. 8, the distance between the rollers 252 and 260 and the rollers 254 and 262 as well as the magnitude of the angles α' and β' are preferably adjustably controllable for use with different dough product processing requirements and applications.

The device 234, shown and schematically illustrated in FIG. 9, may be advantageously used to reduce the dough 264 from the initial thickness 266 to the desired final thickness 268. The dough 264 may be supplied to the processing device 234 by, for example, a suitable conveyor or transport mechanism such that the sheet of dough product 264 may enter the converging region 264. As the dough 264 enters and moves through the converging region 264, the contact surfaces 242 and 246 of the moving endless belts 240 and 244 may engage with the surfaces 270 and 272 of the dough 264 respectively. Such engagement may cause the sheet of dough product 264 to move in direction C as it moves through the converging region 274 such that the sheet of dough product 264 may be gradually compressed as illustrated in FIG. 9. Such gradual compression is advantageous in that less elastic stress may be formed in the sheet of dough product, as the compression profile may be generally less that that of conventional dough rollers. Thus, lower failures and defects such as dough tearing and poor surface qualities may be obtained at generally increased processing speeds.

As the sheet of dough product 264 exits the converging region 274, the dough having the reduced thickness 268 may enter the parallel region 276. The parallel region can allow any elastic stress in the compressed dough to relax such that processing speed may be increased with minimized dough failure and defects.

The present invention is not limited to the above described preferred apparatus and methods. More generally, the invention embraces gradual pressing and extended holding of food products to facilitate reduced elastic snap back and improved surface morphologies reduced dough sheet failures at high processing speeds. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

What is claimed is:

1. An apparatus for forming a pressed food product from an intermediate of dough by pressing the intermediate of dough between a first platen and a second platen as the first platen and the second platen move in a first direction, the apparatus comprising:
   a supporting frame;
   means for moving the first platen in the first direction;
   means for moving the second platen in the first direction;
   a first guide operatively supported by the frame for guiding the first platen as the first platen is moved in the first direction;
   a second guide operatively supported by the frame for guiding the second platen as the second platen is moved in the first direction, the first guide and the second guide having a converging region such that the first guide converges with the second guide and a parallel region where the first guide is substantially parallel to the second guide;
   a continuous conveying belt having perforated regions and a nonstick surface and positioned relative to the first guide such that in the converging and parallel regions, the conveying belt abuts the first platen opposite the first guide;
   wherein the first guide positions the first platen and the second guide positions the second platen as the first platen and the second platen move through the converging region in the first direction so that an intermediate of dough positioned between the first platen and the second platen is effectively pressed between the first platen and the second platen as the first platen converges with the second platen; and
   wherein the first platen and the second platen move through the parallel region in the first direction such that the first platen and the second platen are separated by a predetermined spacing that substantially corresponds to the desired thickness of the pressed dough product.

2. The apparatus of claim 1, wherein at least one of the first and second platens includes a generally flat surface for engaging with and pressing an intermediate of dough.

3. The apparatus of claim 1, wherein at least one of the first and second platens includes a recessed region that can be at least partially filled with a dough product to form a dough product having a shape generally corresponding to the recessed region.

4. The apparatus of claim 1, further comprising a first belt of platens wherein the first belt of platens comprises the first platen interconnected with a plurality of additional platens.

5. The apparatus of claim 4, further comprising a second belt of platens wherein the second belt of platens comprises the second platen interconnected with a plurality of additional platens.

6. The apparatus of claim 4, wherein a means for moving the first platen in the first direction comprises a first sprocket which is supported by the frame for carrying the first belt of interconnected platens and a second sprocket which is supported by the frame for driving the first belt of interconnected platens in the first direction.

7. The apparatus of claim 6, further comprising a tensioner positioned relative to the first belt of interconnected platens for adjustably tensioning the first belt of interconnected platens while the first belt of interconnected platens is carried by the first and second sprockets of the means for moving the first platen.

8. The apparatus of claim 7, further comprising a second belt of platens comprising the second platen interconnected with a plurality of additional platens, wherein a means for moving the second platen in the first direction comprises a third sprocket which is supported by the frame for carrying the second belt of interconnected platens and a fourth sprocket which is supported by the frame for driving the second belt of interconnected platens in the first direction.

9. The apparatus of claim 8, further comprising a tensioner positioned relative to the second belt of interconnected platens for adjustably tensioning the second belt of interconnected platens while the second belt of interconnected platens is carried by the third and fourth sprockets.

10. The apparatus of claim 1, wherein the conveying belt is movable in the first direction.

11. The apparatus of claim 1, further comprising at least one driving means positioned with respect to at least one of the first and second platens and which driving means is capable of engaging with the at least one platen for at least partially driving the at least one platen in the first direction.

12. The apparatus of claim 4, further comprising a first heat generating device positioned with respect to the first belt of interconnected platens for heating at least one of the platens of the first belt of interconnected platens to a desired temperature.

13. The apparatus of claim 1, further comprising:
a second belt of platens comprising the second platen interconnected with a plurality of additional platens; and
a second heat generating device positioned with respect to the second belt of interconnected platens for heating at least one of the platens of the second belt of interconnected platens to a desired temperature.

14. The apparatus of claim 1, wherein the means for driving the first platen comprises a drive belt which includes a plurality of rollers.

15. An apparatus for forming a pressed food product from an intermediate of dough by pressing the intermediate of dough between a first platen and a second platen as the first platen and the second platen move in a first direction, the apparatus comprising:
a supporting frame;
means for moving the first platen in the first direction;
means for moving the second platen in the first direction;
a first guide operatively supported in a substantially stationary position by the frame for guiding the first platen as the first platen is moved in the first direction;
a second guide operatively supported by the frame for guiding the second platen as the second platen is moved in the first direction, the first guide and the second guide having a converging region such that the first guide converges with the second guide and a parallel region where the first guide is substantially parallel to the second guide;
a first continuous conveying belt having perforated regions and a nonstick surface and positioned relative to the first guide such that in the converging and parallel regions, the first conveying belt abuts the first platen opposite the first guide;
a second continuous conveying belt having a nonstick surface and positioned relative to the second guide such that in the converging and parallel regions, the second conveying belt abuts the second platen opposite the second guide;
wherein the first guide positions the first platen and the second guide positions the second platen as the first platen and the second platen move through the converging region in the first direction so that an intermediate of dough positioned between the first platen and the second platen is effectively pressed between the first platen and the second platen as the first platen converges with the second platen; and
wherein the first platen and the second platen move through the parallel region in the first direction such that the first platen and the second platen are separated by a predetermined spacing that substantially corresponds to the desired thickness of the pressed dough product.

16. An apparatus for forming a pressed food product from an intermediate of dough by pressing the intermediate of dough between a first platen and a second platen as the first platen and the second platen move in a first direction, the apparatus comprising:
a supporting frame;
means for moving the first platen in the first direction;
means for moving the second platen in the first direction;
a first guide operatively supported by the frame for guiding the first platen as the first platen is moved in the first direction, the first guide defining a substantially continuous guide surface extending from a converging guide surface portion to a parallel guide surface portion, wherein the converging guide surface portion has a radius of about 40 feet;
a second guide operatively supported by the frame for guiding the second platen as the second platen is moved in the first direction, the first guide and the second guide having a converging region corresponding to the converging surface portion of the first guide such that the first guide converges with the second guide and a parallel region corresponding to the parallel guide surface portion of the first guide surface where the first guide is substantially parallel to the second guide;
a continuous conveying belt having a nonstick surface and positioned relative to the first guide such that in the converging and parallel regions, the conveying belt abuts the first platen opposite the first guide;
wherein the first guide positions the first platen and the second guide positions the second platen as the first platen and the second platen move through the converging region in the first direction so that an intermediate of dough positioned between the first platen and the second platen is effectively pressed between the first platen and the second platen as the first platen converges with the second platen; and wherein the first platen and the second platen move through the parallel region in the first direction such that the first platen and the second platen are separated by a predetermined spacing that substantially corresponds to the desired thickness of the pressed dough product.

* * * * *